Oct. 21, 1941.     J. H. DORAN ET AL     2,260,009
GEARING
Filed Jan. 5, 1939
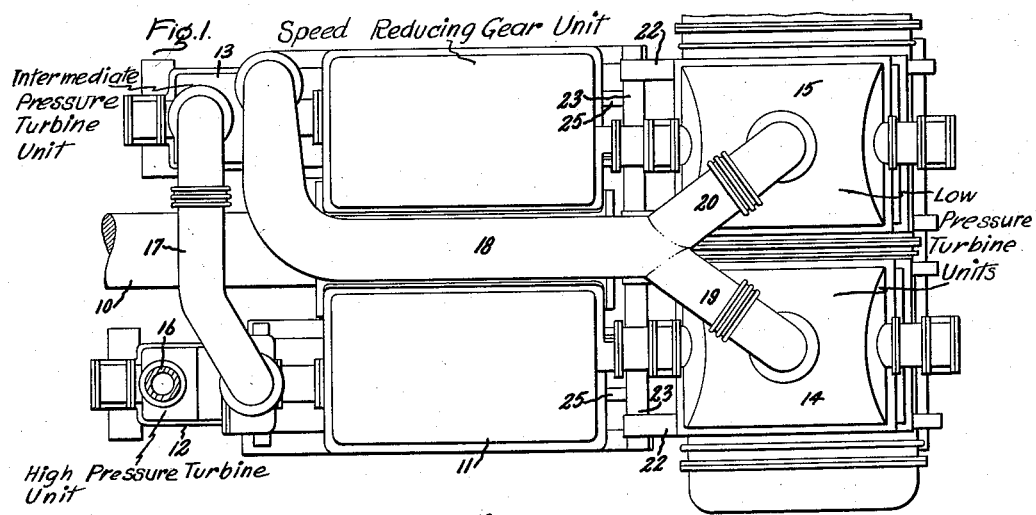
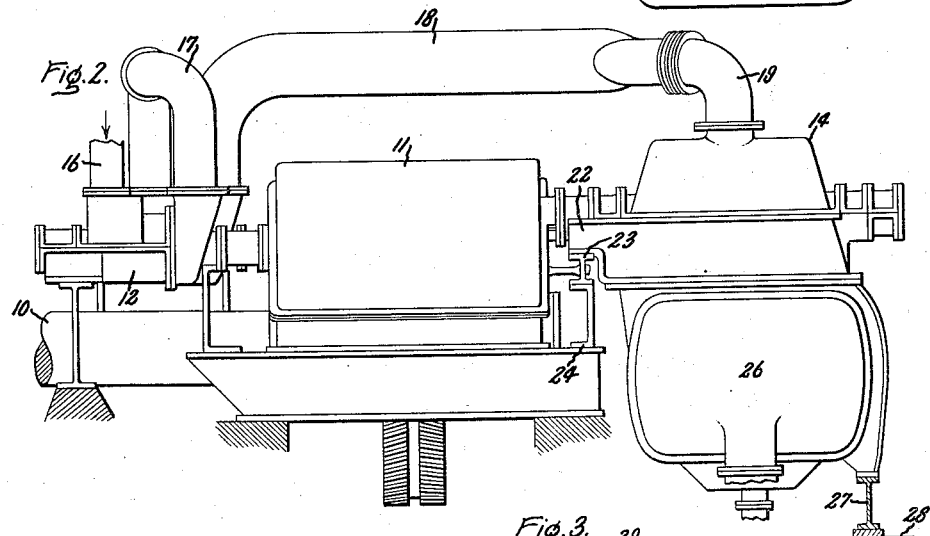
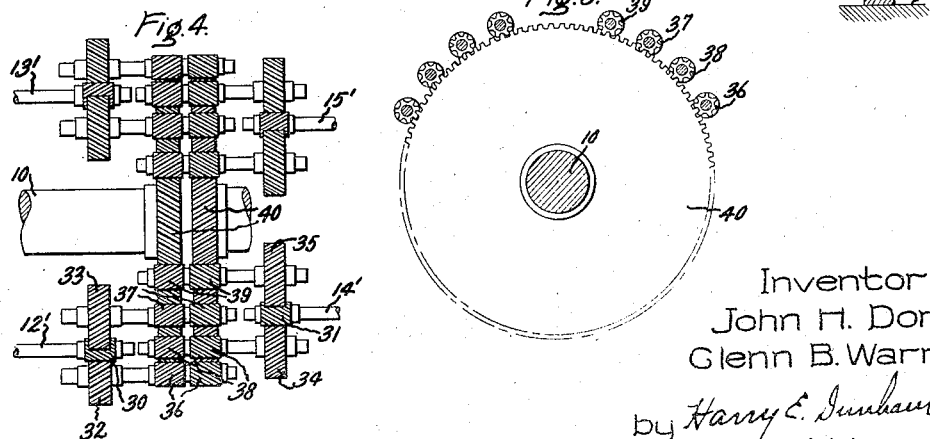
Inventors:
John H. Doran,
Glenn B. Warren,
by Harry E. Dunham
Their Attorney.

Patented Oct. 21, 1941

2,260,009

UNITED STATES PATENT OFFICE 2,260,009

GEARING

John H. Doran, Scotia, and Glenn B. Warren, Niskayuna, N. Y., assignors to General Electric Company, a corporation of New York Application January 5, 1939, Serial No. 249,467

3 Claims. (Cl. 74—410)

This invention relates to marine turbine installations in which a plurality of turbines or prime movers are arranged for driving a propeller shaft through a common speed reduction gear unit.

Serious space limitations in the engine room of ships and particularly in naval vessels, require that the size of the power plant, as well as that of other apparatus, be kept at a minimum. To meet the demand for greater ship speeds and hence greater power output, more efficient turbine arrangements are required in order that the vessels need not be materially enlarged to accommodate the prime mover plant of increased capacity. It is an obvious fact that in order to materially increase the power output of a turbine unit, its size must be increased accordingly, which in turn necessitates a corresponding decrease in turbine speed. Lowering of the turbine speed, on the other hand, means lowering of its efficiency. It is proposed to maintain a relatively high turbine speed and high power plant efficiency by breaking the turbine into a plurality of smaller units, a high pressure, an intermediate pressure and two low pressure units, and gear them all to the propeller shaft through a single speed reduction unit. While it is recognized that it is not new to merely connect four such turbines through a common gearing to a propeller shaft, such heretofore known arrangements are unsatisfactory for reason of excessive space requirements and cumbersome gearing methods.

It is an object of this invention to provide a new and improved marine turbine driving arrangement which is compact, light in weight, and of high efficiency.

It is a further object of this invention to provide a new and improved marine turbine arrangement in which a high pressure turbine unit, an intermediate pressure turbine unit, and two low pressure turbine units are connected to a propeller shaft through a single speed reduction gear unit.

It is a further object of this invention to provide an improved construction and arrangement of gearings.

In the illustrated embodiment of this invention, relatively small high and intermediate pressure turbines are arranged on the aft side of the speed reduction gear unit on opposite sides of the propeller shaft while the two relatively larger low pressure turbine units are mounted closely adjacent each other on the forward side of the gear unit, the turbines being all connected to the common main drive gear through pairs of inter-positioned high speed gears and pinions.

For a consideration of what we believe to be novel and our invention, attention is directed to the following description and the claims appended thereto taken in connection with the accompanying drawing.

In the drawing, Fig. 1 is a plan view of the turbine arrangement; Fig. 2 is a side elevation thereof; and Figs. 3 and 4 are views illustrating certain details of the gearing arrangement.

Referring to the drawing, the propeller shaft 10 is shown extending aft from the speed reduction gear unit or housing 11. Because of the relatively large amount of power and the stresses carried by the propeller shaft, it must inherently be of a relatively large diameter. The size of the speed reduction gear unit must also be large due to the high speed reduction ratio as well as the large torque which must be transmitted therethrough. The high and intermediate pressure turbines 12 and 13, respectively, are arranged on opposite sides of the propeller shaft on the aft side of the gear unit 11. Because of the relatively small size of these turbine units, there is ample space between them to accommodate the propeller shaft 10 while the turbines themselves need not extend beyond the sides of the gear unit. These turbine units may be supported in any well-known manner such as that indicated. The low pressure turbine units 14 and 15 are arranged on the forward side of the gear unit and immediately adjacent each other for the maximum economy of space. Elastic fluid from a source (not shown) may be supplied in a well-known manner to the turbines, for example, through the conduit 16 to the high pressure turbine, from there, through the crossover connection 17 to the intermediate pressure turbine, which in turn exhausts through the pipe 18 and branches 19 and 20 to the low pressure units.

With the low pressure turbine units located side by side and close together, considerable savings in space and weight of apparatus are accomplished in the turbine supporting means and in the condenser arrangement. The ends of the low pressure turbine units adjacent the gear unit 11 are suitably secured thereto so as to preclude relative movements therebetween due to shifting of the apparatus or to expansion movements thereof under varying conditions of temperature. The side arms 22 of the low pressure turbine exhaust casings may be supported upon a transversely extending beam 23 which in turn may be supported from the base of the gear housing 11 or any other stationary foundation by members 24. The beam 23 is rigidly positioned with respect to the gear housing 11 by means of the struts 25 extending therebetween. A single transversely arranged condenser 26 may be provided for receiving the exhaust of the two turbine units. The exhaust casings of the two units are rigidly connected to the upper portion of the condenser shell, the side of which remote from the gear housing 11 is supported upon a relatively flexible I-beam section 27 secured to the stationary foundation 28. The condenser arrangement, including the means for maintaining the predetermined alignment of the turbine units and allowing for expansion movements thereof, is more fully described in the copending application of John H. Doran, filed January 5, 1939, Serial No. 249,468 and assigned to the General Electric Company, it being of his sole invention.

In order that the size and weight of the gear unit 11 may be reduced to a minimum, it is preferred to connect the various turbines thereto through pairs or twin sets of intermediate speed reducing gears the pinions of which are arranged in a novel manner around the main drive gear. The arrangement is more clearly indicated in the plan view of Fig. 4 in which the shafts of the various turbine units are represented at 12', 13', 14', and 15'. Since the gearing arrangements on the opposite sides of the propeller shaft are balanced and hence substantially identical, only that on the lower side of the propeller shaft, as viewed in Fig. 4, will be specifically described. The turbine unit shafts 12' and 14' are provided with pinions 30 and 31, respectively, which are each engaged by pairs of oppositely arranged high speed gears 32, 33 and 34, 35, respectively. The last mentioned gears are provided on auxiliary shafts having pinions 36, 37 and 38, 39, respectively, in engagement with the main drive gear 40. It will be noted that the pinions 36 and 37 are spaced relatively widely apart so that the pinion 38 may be arranged therebetween, the pinion 37 in turn being similarly disposed between the pinions 38 and 39. The gear arrangement on the opposite side of the propeller shaft for the intermediate pressure turbine 13 and the low pressure turbine 15 is substantially similar to that described. The interspaced relationship of the various pinions with respect to the main drive gear 40 is further illustrated in Fig. 3. Since the load of each turbine is transmitted to the main drive gear through two sets of intermediate gears and thus through a double number of teeth, the main drive gear 40 need be only substantially one-half the width that would be required were the power transmitted from each turbine through a single intermediate gear and pinion of a correspondingly large size. The difficulties of manufacture and operation of the extra wide gears are therefore alleviated. The bearing arrangement is also simplified, contributing to make possible the compact arrangement of the turbines shown. By interspacing the pinions of the oppositely disposed turbines on the main drive gear, all of the turbines may be connected to the main drive gear on the upper half thereof. This arrangement is desirable in that all gears are readily accessible by the removal of the upper housing parts thus making the inspection and repair or removal of the individual gears relatively simple since an overhead crane may be used on all gears. This would not be true if it were necessary to connect some of the turbines to the main drive gear on the lower half thereof.

It will be noted that the turbine shafts 12' and 13' are spaced widely apart in order that space be allowed between the high and intermediate pressure turbines for the accommodation of the propeller shaft 10 therebetween. On the other hand, the turbine shafts 14' and 15' are spaced relatively close together for the more efficient arrangement of the lower pressure turbine units upon the condenser structure 26 with a corresponding saving in space at the forward end of the installation. By this arrangement the width of the prime mover installation both on the high and low pressure sides is very little, if any, greater than the width of the housing of the gear unit 11, the size of which unit being reduced to a minimum by the compact gearing arrangement disclosed.

Thus, with my invention I have provided an improved construction of marine turbine arrangements whereby a plurality of elastic fluid turbines or like prime movers connected to a single propeller by a speed-reducing gearing may be readily assembled and dismantled. Each of the turbines or prime movers may be dismantled without necessitating complete dismantling of the gearing, particularly the main gear thereof. An improved gearing arrangement according to my invention includes a main gear, a plurality of parallel pinion shafts located on opposite sides of the main gear and pairs of speed-reducing gearings between each pinion shaft and the main gear. Each pair of the speed-reducing gearings 32, 33 includes a pair of pinions 36, 37 engaging the main gear 40 and interspaced with pinions of oppositely located shafts. In a preferred embodiment, as shown in the drawing, the arrangement is substantially symmetrical with regard to a plane through the axis of the main gear, and the pairs of pinions 36, 37 and 38, 39, etc., are circumferentially spaced over less than one-half of the circumference of the main gear.

Having described the principle of operation of our invention together with the apparatus which we now consider to represent the best embodiment thereof, we desire to have it understood that the apparatus shown is only illustrative and that the invention may be carried out by other means.

What we claim as new and desire to secure by Letters Patent of the United States is:

1. Gearing arrangement comprising a main gear, a plurality of parallel pinion shafts located on opposite sides of the main gear, and pairs of speed-reducing gearings between each pinion shaft and the main gear, each pair including a pair of pinions for engaging the main gear and the pair of pinions of oppositely located shafts being interspaced with each other.

2. Gearing arrangement comprising a main gear, a plurality of parallel shafts each having a pinion, the shafts being located on opposite sides of the main gear, and pairs of speed-reducing gearings including pairs of pinions between each pinion and the main gear, the arrangement being substantially symmetrical with regard to a plane through the axis of the main gear and the pairs of pinions being spaced over less than one-half of the circumference of the main gear.

3. Gearing arrangement comprising a main gear, a plurality of drive shafts located on opposite sides of the main gear, and a plurality of pairs of speed-reducing gears each having two pinions engaging circumferentially spaced portions of the main gear and means connecting each pair of speed-reducing gears to one of the drive shafts, one pinion of at least one pair of speed-reducing gears being interspaced with the two pinions of another pair of speed-reducing gears.

JOHN H. DORAN.
GLENN B. WARREN.